United States Patent

Widigen et al.

[11] Patent Number: 5,822,786
[45] Date of Patent: Oct. 13, 1998

[54] APPARATUS AND METHOD FOR DETERMINING IF AN OPERAND LIES WITHIN AN EXPAND UP OR EXPAND DOWN SEGMENT

[75] Inventors: Larry Widigen, Salinas; Elliot A. Sowadsky, Santa Clara, both of Calif.

[73] Assignee: Advanced Micro Devices, Inc., Sunnyvale, Calif.

[21] Appl. No.: 339,592

[22] Filed: Nov. 14, 1994

[51] Int. Cl.$^6$ .................................................. G06F 12/02
[52] U.S. Cl. ............................... 711/209; 711/2; 711/201; 364/736.01; 364/737; 364/760.02; 364/786.03; 371/21.5; 371/40.11
[58] Field of Search .......................... 396/650; 364/756, 364/769, 736.01, 737, 760.02, 786.03; 395/800, 479, 490, 497.02, 412, 418, 419, 421.02, 421.04; 711/201, 209, 2; 371/21.5, 40.11

[56] References Cited

U.S. PATENT DOCUMENTS

| | | | |
|---|---|---|---|
| 3,814,919 | 6/1974 | Repton et al. | 395/183.01 |
| 4,325,120 | 4/1982 | Colley et al. | 395/412 |
| 4,434,464 | 2/1984 | Suzuki et al. | 395/491 |
| 4,442,484 | 4/1984 | Childs, Jr. et al. | 364/200 |
| 4,519,032 | 5/1985 | Mendell | 395/650 |
| 4,783,757 | 11/1988 | Krauskopf | 364/784 |
| 4,837,738 | 6/1989 | Lemay et al. | 395/421.1 |
| 4,851,989 | 7/1989 | Kagimasa et al. | 395/416 |
| 4,873,630 | 10/1989 | Rusterholz et al. | 395/800.03 |
| 4,918,636 | 4/1990 | Iwata et al. | 364/715.06 |
| 4,972,338 | 11/1990 | Crawford et al. | 364/200 |
| 5,204,953 | 4/1993 | Dixit | 395/400 |
| 5,313,606 | 5/1994 | Luong et al. | 395/462 |
| 5,394,351 | 2/1995 | Widigew et al. | 364/786 |
| 5,418,736 | 5/1995 | Widigew et al. | 364/786 |
| 5,440,710 | 8/1995 | Richter et al. | 395/417 |
| 5,577,219 | 11/1996 | Timko et al. | 711/201 |

OTHER PUBLICATIONS

"Intel 486™ . . . Manual," 1992.
Gerritt A. Blaauw; "Digital System Implementation"; Prentice Hall, 1976; Section 2–12, pp. 54–58.

David A. Patterson & John L. Hennessy; "Computer Arithmetic: A Quantitive Approach"; Morgan Kaufmann Publishers, 1990; pp. A–42 thru A–43.

C.S. Wallace; "Computer Arithmetic"; A Suggestion for a Fast Multiplier; IEEE Transactions on Electric Computers EC–13 14–7, 1964, pp. 114–117.

Kai Hwang; "Computer Arithmetic: Principles, Architecture, and Design"; John Wiley & Sons, 1979; pp. 98–100.

Tanenbaum, "Structured Computer Organization", Prentice–Hall, Inc., 1976, (pp. 420–422).

*Primary Examiner*—Alyssa H. Bowler
*Assistant Examiner*—John I. Follansbee
*Attorney, Agent, or Firm*—Townsend and Townsend and Crew LLP

[57] ABSTRACT

Dedicated parallel comparators perform expand up or expand down segment limit checks for memory accesses. A first three-input comparator has as inputs the complement of the segment limit, the effective address of the first byte of the access, and an configurable third input. For expand up segments, the configurable third input is set to one less than the memory access size. A carry out of the first comparator is generated, and thereby a limit fault indicated, if the address of the last byte of the access exceeds the segment limit. For expand down segments, the configurable third input is set to zero. In this case, the lack of a carry out of the first comparator indicates that the address of the first byte of the access exceeds the segment limit. For expand down segments a parallel second two-input comparator is also used. The second comparator has as inputs the effective address and a hybrid second input. A least significant portion of the hybrid input is set to one less than the memory access size. Multiple bits in a most significant portion of the hybrid input reflect the complement of the segment descriptor's B-bit. The second comparator generates a carry whenever the address of the last byte of the memory access wraps the segment's maximum address value. For expand down segments, a limit fault is indicated by the logical OR of the complement of the first comparator's carry out with the carry out of the second comparator.

9 Claims, 4 Drawing Sheets

APPARATUS AND METHOD FOR DETERMINING IF AN OPERAND LIES WITHIN AN EXPAND UP OR EXPAND DOWN SEGMENT

CROSS-REFERENCE TO RELATED APPLICATIONS

The present application is related to copending application Ser. No. 08/185,488 filed Jan. 21, 1994, entitled "SUPERSCALAR EXECUTION UNIT FOR SEQUENTIAL INSTRUCTION POINTER UPDATES AND SEGMENT LIMIT CHECKS," by inventors E. A. Sowadski, L. Widigen, D. L. Puziol, and K. S. Van Dyke (agent docket number NM.1993.3) now U.S. Pat. No. 5,590,351. This application is incorporated herein by this reference and is assigned to the assignee of the present invention.

BACKGROUND
CARRY-SAVE ADDERS

Gerrit A. Blaauw describes carry-save adders (CSAs) in section 2–12 of "Digital System Implementation" (Prentice-Hall, 1976). Blaauw indicates that the CSA was mentioned by Babbage in 1837, by von Neumann in 1947, and used in 1950 in M.I.T.'s Whirlwind computer. J. L.Hennessy and D. A. Patterson discuss carry-save adders on pages A-42 and A-43 of "Computer Architecture, A Quantitative Approach" (Morgan Kaufmann, 1990).

In "A Suggestion for a Fast Multiplier" (IEEE Transactions on Electronic Computers EC-13:14–17, 1964), C. S. Wallace, indicates that "an expedient now quite commonly used" is to add three numbers using a CSA. If a set of more than three numbers are to be added, three of the set are first added using the CSA and the carry and sum are captured. The captured carry and sum and routed back to two of the tree inputs, and another number from the set is input to the third input. (Whenever the carry-outs generated by a CSA are subsequently added in another adder, an implicit one-bit left shift of the carry-bits is implemented via the wiring between the adders.) The process is repeated until all of the numbers in the set have been added. Finally, the sum and carry are added in a "conventional" carry-propagate adder (CPA). In "Computer Arithmetic: Principles, Architecture, and Design" (John Wiley & Sons, 1979, pp. 98–100), K. Hwang describes this same technique in greater detail.

Wallace extended the use of CSAs from adding three-inputs to adding an arbitrary number of values simultaneously, while having only a single carry-propagate path. One application of the Wallace-tree (as it came to be known) is high-performance hardware multipliers. Generally, a Wallace-tree consists of successive levels of CSAs, each level reducing the number of values being added by 3:2, since each CSA takes three inputs and produces 2 outputs. At the bottom of the tree a CPA is used to add the last carry/sum pair.

THE INDUSTRY STANDARD X86 ARCHITECTURE

The X86 architecture exists as a defacto industry standard. It is not formally defined and there is no official published specification. The X86 architecture is perhaps best defined as the processor behavior expected by the majority of application programs running on IBM-compatible personal computers.

The X86 architecture has expand up and expand down segment types. Valid addresses for expand down segments start at the maximum address value associated with the segment (either 4 GB or 64 KB) and extend downward to within one byte of the segment limit. The maximum address value is also sometimes loosely referred to as the upper segment limit. Later in this disclosure the maximum address value will be called the Top of Segment. Expand down segments are intended for stacks that grow from high addresses towards low addresses.

Valid addresses for expand up segments start at the segment base address and extend upward to and include the segment limit. Expand up segments are intended for all non-stack references.

The X86 architecture has 32-bit or 16-bit address-size attributes for each address calculation as determined by a combination of defaults, instruction prefixes, and size-specification bits in segment descriptors. For stack references that are an implicit part of an instruction's operation, the address-size is given by the B-bit of the data segment associated with the stack. For all other data references, the address-size is given by the D-bit of the current code segment, unless reversed by an address-size instruction prefix.

Regardless of the address-size attribute for a given address calculation, the maximum address value of an expand down segment is given by the B-bit. Expand down segments with B equal one, have a 4 GB maximum address value. Expand down segments with B equal zero, have a 64 KB maximum address value.

INTEL SEGMENTED ARCHITECTURE

U.S. Pat. No. 4,442,484 ('484) MICROPROCESSOR MEMORY MANAGEMENT AND PROTECTION MECHANISM, to Childs et al., issued Apr. 10, 1984, described a processor for a segmented architecture having many features of the X86 architecture, and is hereby incorporated by reference.

U.S. Pat. No. 4,972,338 ('338) MEMORY MANAGEMENT FOR MICROPROCESSOR SYSTEM, to Crawford et al., issued Nov. 20, 1990, described the addition of paging to a segmented architecture.

U.S. Pat. No. 5,204,953 ('953) ONE CLOCK ADDRESS PIPELINING IN SEGMENTATION UNIT, to Dixit, issued Apr. 20, 1993, discloses pipelined single-clock address generation for segment limit checking.

U.S. Pat. No. 4,783,757 ('757) THREE INPUT BINARY ADDER, to Krauskopf, issued Nov. 8, 1988, teaches a carry-save adder followed by carry-propagate adder for adding three operands of 32 bits. '757 teaches the use of a full adder at a 33rd bit position (bit<32>) of the carry-propagate adder for generating an overall carry. (There are 33 full adders in the CPA, overall.) '757 also discloses an alternate embodiment that describes a segment limit checking "adder." This limit check adder comprises a mostly 2-input carry-save adder with least significant bit (lsb) provisions for a third input having the values 0, 1, 2, or 3. The carry-save adder is followed by a carry-chain. For 32-bit operands, the carry-save adder uses 30, two-input, circuits for bits<31..2> (bits 31 through 2), one three-input circuit for bit<1>, and no circuit for bit<0>. The carry-chain has 32 (for bits<31..0>) carry-circuits corresponding to a full-adder, but the sum logic is not present. The 3-inputs (one being the carry-in) of the bit<0> carry-circuit are used for the lsb of the three operands being added. An OR gate, combining the bit<31> carries of the carry-chain and the carry-save circuits, generates the overall carry for the segment limit checking adder.

PROBLEMS WITH CONVENTIONAL APPROACHES TO SEGMENT LIMIT CHECKING

Two's complement techniques are conventionally implicitly employed for binary arithmetic, including comparisons. To perform some comparisons in a single step with two's complement methods might require a custom comparator or adder with a large number (more than three) of inputs. To use more conventional comparators may require multiple steps. To evaluate both the first and last bytes of an operand in a single step might require two distinct comparators. New segment limit checking designs are needed for today's high performance segmented architecture processors to keep segment limit checking from adversely affecting either performance or cost. Thus, improvements in speed and minimization of hardware are needed.

SUMMARY

It is a first object of the present invention to provide expand up and expand down segment limit checking logic for a high-performance segmented architecture processor.

It is a second object of the instant invention to maximize the speed of said segment limit checking logic.

It is a third object of the current invention to minimize the logic required to implement said segment limit checking logic.

It is a first feature of the immediate invention to use one's complement arithmetic to implement comparisons for expand up and expand down segment limit checking. To the best of their knowledge, the inventors believe they are the first to recognize that employing only two's complement techniques results in less than optimal hardware and speed for segment limit checking. Using two's complement techniques is arguably the obvious approach, which is not taken by the immediate invention.

It is a second feature of the present invention to exploit common comparison hardware for both expand up and expand down segment limit checking.

It is a third feature of the instant invention to use as a single input to a comparator a pre-processed variable equal to one less than the size of the memory access being subjected to segment limit checking, and thereby perform operand address validity checking with respect to the segment limit (upper segment boundary for expand up segments, lower segment boundary for expand down segments) with a comparator having only three inputs.

It is a fourth feature of the current invention to use as a single input to a comparator a variable which combines the complement of the top of segment (upper segment boundary) value with the value of the memory access size minus one, and thereby perform expand down operand address validity checking with respect to the top of segment with a comparator having only two inputs.

It is a fifth feature of the immediate invention to use only a single comparison to evaluate expand up data segments. To the best of their knowledge, the inventors believe they are the first to recognize the excessive and unnecessary hardware requirements associated with performing a second comparison for operand segment limit checking. Performing both comparisons is arguably the obvious approach, which is not taken by the immediate invention.

It is a sixth feature of the present invention to evaluate in parallel both upper (top of segment) and lower (segment limit) expand down segment boundaries for all bytes of an operand.

It is a seventh feature of the instant invention to perform each comparison required with only a single carry propagation.

It is an advantage of said first feature of the immediate invention that the number of comparator inputs required and the number of times the comparison hardware must be used is minimized. Specifically, the desired comparisons may be performed in parallel in a single pass through the comparison hardware. Both the speed of segment limit checking is maximized and the hardware is minimized.

It is an advantage of said second, third, and fourth features that the segment limit check hardware is minimized without compromising speed.

It is an advantage of said fifth feature to minimize the segment limit check hardware.

It is an advantage of said sixth and seventh features that the speed of segment limit checking is maximized.

These and other features and advantages of the invention will be better understood in view of the accompanying drawings and the following detailed description, including an exemplary embodiment, which illustrates various objects and features thereof. The exemplary embodiment shows how these circuits can be used to perform segment limit checking in a particular microarchitecture. The use of these circuits is not limited to the context of the exemplary embodiment.

NOTATION

Schematic lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9..0>). Signals which are active low are indicated by the use of a trailing asterisk (*) or a leading exclamation point (!). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. In certain instances where confusion is likely to occur, an explicit fanout symbol will be employed. This fanout symbol, an elongated triangle, will have an associated bit size consisting of a number followed by a capital B. The fanout bit size thus indicates that a single bit signal is connected to a wire or component that is as wide as the designated fanout bit width. When merging two or more signals into one, or demerging two or more signals from one, the significance order of the individual component signals within the combined signal is explicitly shown with MSB and LSB labels adjacent to the merge or demerge.

DETAILED DESCRIPTION OF THE INVENTION

SYSTEM OVERVIEW

U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, described a high-performance X86 processor that defines the system context in which the instant invention finds particular application, and is hereby incorporated by reference.

The processor has multiple function units capable of performing parallel speculative execution. The function units include a Numerics Processor unit (NP), an Integer Execution Unit (IEU), a Dual Execution Unit (DEU), and an Address Preparation unit (AP). (The DEU is disclosed in U.S. application Ser. No. 08/185488, incorporated by reference supra.) The processor is currently implemented in two main chips (one being the NP unit and the other being the remaining function units) and an external level-two (L2) SRAM cache. A typical computer will include a memory controller chip as well.

Instructions are fetched and decoded by a DECoder unit (DEC), which generates tagged pseudooperations (p-ops) that are broadcast to the functional units. Each instruction will result in one or more p-ops being issued. For the purpose of this invention the terms p-op and operation are used interchangeably. Each operation executed by the processor may correspond to one instruction or to one p-op of a multi-p-op instruction.

DEC "relabels" (or reassigns) the "virtual" register specifiers used by the instructions into physical register specifiers that are part of each p-op. This allows DEC to transparently manage physical register files within the execution units. Register relabeling (reassignment) is integral to the processor's ability to perform speculative execution. The p-ops could be viewed as very wide horizontal (largely unencoded) control words.

The wide horizontal format is intended to greatly facilitate or eliminate any further decoding by the execution units. DEC performs branch prediction and speculatively issues p-ops past up to two unresolved branches. I.e., DEC fetches down and pre-decodes instructions for up to three instruction streams.

The AP unit contains a relabeled virtual copy of the general purpose registers and segment registers and has the hardware resources for performing segmentation and paging of virtual memory addresses. AP calculates addresses for all memory operands, control transfers (including protected-mode gates), and page crosses.

The DEU performs superscalar instruction pointer updates and performs associated segment limit checking for sequential control flow.

IEU also contains a relabeled virtual copy of the general purpose registers and segment registers (kept coherent with AP's copy) and has the hardware resources for performing integer arithmetic and logical operations. NP contains the floating-point register file and has the floating-point arithmetic hardware resources.

Each execution unit has its own queue into which incoming p-ops are placed pending execution. The execution units are free to execute their p-ops largely independent of the other execution units. Consequently, p-ops may be executed out-of-order. When a unit completes executing a p-op it sends terminations back to DEC. DEC evaluates the terminations, choosing to retire or abort the outstanding p-ops as appropriate, and subsequently commands the function units accordingly. Multiple p-ops may be retired or aborted simultaneously. A p-op may be aborted because it was downstream of a predicted branch that was ultimately resolved as being mispredicted, or because it was after a p-op that terminated abnormally, requiring intervening interrupt processing.

Aborts cause the processor state to revert to that associated with some previously executed operation. Aborts are largely transparent to the execution units, as most processor state reversion is managed through the dynamic register relabeling specified by DEC in subsequently issued p-ops.

LIMIT CHECK THEORETICAL DEVELOPMENT—EXPAND UP SEGMENTS

In the segmented architecture of the present invention, each operand or instruction to be accessed should lie completely within the bounds of the data segment (DS, ES, FS, or GS) or stack segment (SS) as specified by the corresponding segment limit. Otherwise, a limit fault should be signaled. The Limit Check Logic 100, 200, and 300, of FIGS. 1 through 3, resides in the AP unit and performs limit checking for all read or write operand address calculations. Additionally, for all non-sequential control flow, the logic checks the address calculation for the first byte of the target instruction (the location where control flow resumes). The address calculation for the last byte of the target instruction, and all subsequent sequential instructions, is checked by the DEU. In response to a limit fault indication from the Limit Check Logic, the AP unit will signal an abnormal termination for the associated p-op. In the context of the present invention, the address calculations and any resulting limit faults are initially tentative, given that the operations are executed speculatively.

The maximum memory operand size read or written in parallel by the microarchitecture is 8-bytes. Any X86 operation requiring an operand size larger than 8-bytes is decomposed by DEC into multiple sequential primitive operations involving 8-bytes or less.

For expand up segments, valid addresses are from zero through the Segment Limit, inclusive. A limit of zero represents a segment of size 1-byte, when the Granularity (G) bit is zero, or 4K-bytes when the G bit is one. As a practical matter, for 32-bit expand up segments, it is sufficient to compare the address of the last byte of a operand against the segment limit. It is considered unnecessary to evaluate the address of any of the other operand bytes with respect to the segment limit. However, any operand that straddles the "top" of 32-bit memory (4 GB−1) when the limit is not set at maximum (also 4 GB−1), will not trigger a segment fault, even though the operand begins in a location outside the valid bounds of the segment. Extensive compatibility testing has not discovered any existing X86 applications for which this "false-negative" result is an issue. This pathological case is viewed as sufficiently unlikely to occur that the additional logic required to handle it is not justified. The false-negative result does not occur for segment limit checks on target instructions. Between the logic of the instant invention and DEU, the target instructions of a change in control flow always have both first and last bytes checked. Sequential control flow across any 4 KB boundary (including 4 GB−1 or 64K−1) is treated by the microarchitecture in the same manner as a change in control flow. Once the target of the change in control flow (actual or emulated) passes the limit checks, it is sufficient to check only the last byte of subsequent sequential instructions, as is done by the DEU. Hence instruction segment limit faults are always detected.

Based on the foregoing, a limit fault is signaled for memory operands, if the following equation is satisfied:

{Effective address+[Operand Size−1]}>Segment Limit.

Binary comparisons may be performed using radix complement (two's complement) arithmetic. Using two's complement arithmetic, the evaluation of A−B yields: 1) A<B, if there is no carry, or 2) A≧B, if there is a carry. Hence, two's complement may be used to evaluate:

0>Segment Limit−{Effective address+[Operand Size−1]}.

That is, the limit fault may be evaluated by subtracting {Effective address+[Operand Size−1]} from the Segment Limit, using two's complement techniques. A limit fault condition is indicated when the carry is false. Binary comparisons may also be performed using diminished-radix complement (one's complement) arithmetic. Using one's complement arithmetic, the evaluation of A−B yields: 1) A≦B, if there is no carry, or 2) A>B, if there is a carry. Hence, one's complement may be used to evaluate:

Effective address+[Operand Size−1]−Segment Limit>0.

That is, the limit fault may be evaluated by subtracting Segment Limit from {Effective address+[Operand Size−1]}, using one's complement techniques. A limit fault condition is indicated when the carry is true.

Consideration of the implementation requirements for the two preceding equations will reveal that the one's complement equation offers distinct advantages. Specifically, if [Operand Size−1] is treated as a single variable, OSZM1, rather than an expression, then only the single variable Segment Limit need be complemented and the evaluation may be performed on all components simultaneously with a single conventional three-input CSA adder. In contrast, for the two's complement case, the evaluation has more components than can be evaluated simultaneously with a single conventional three-input adder.

Continuing with the one's complement equation, the term "−Segment Limit" is then replaced with it's one's complement, !Segment Limit (where "!" indicates complementation), and the equation manipulated to its final form:

Effective address+[Operand Size−1]+!Segment Limit >0.

The inequality is evaluated by observing whether the binary addition of the three components results in a carry. Whenever the value of the address of the last byte of an operand exceeds the segment limit, a carry out of the highest bit position (C<3 1> for a 32-bit, 3-operand comparison) occurs and a Limit Fault is indicated.

The above analysis presumes memory operands are being checked. The same hardware may be used for the checking the first byte of a target instruction, if [Operand Size−1] is set to zero.

The above analysis also presumes 32-bit hardware is used for the comparison. The same hardware may be used, unmodified, for 16-bit expand up segments. Note however, that any operand that straddles and wraps around the "top" of 16-bit memory (64 KB−1) when the limit is set at maximum (also 64 KB−1), will trigger a segment fault, even though the operand can be viewed as existing wholly inside the valid bounds of the segment. Extensive compatibility testing has not discovered any existing X86 applications for which this "false-positive" result is an issue. As a result, this second pathological case is also viewed as sufficiently unlikely to occur that the additional logic required to handle it is not justified. The false-positive result does not occur for segment limit checks on target instructions. A target instruction whose first byte is at the maximum limit value will not cause a limit fault indication in the logic of the present invention, because no carry will be generated out of the highest bit position.

LIMIT CHECK THEORETICAL DEVELOPMENT—EXPAND DOWN SEGMENTS

For expand down segments valid addresses range from the "Top of Segment" down to the Segment Limit+1, inclusive. The Top of Segment is 4 GB−1 (FFFFFFFF$_{16}$) when the B bit is 1, or 64 KB−1 (0000FFFF$_{16}$) when the B bit is 0. A limit of 4 GB−1 represents a segment of size zero, when the B bit is 1. When B is zero, a size zero segment has a limit of 64 KB−1. Conversely, a limit of zero corresponds to the maximum segment size for an expand down segment, 4 GB−1 for B=1, or 64 KB−1 for B=0. Note that the maximum segment sizes are one less than the expand up case. Furthermore, it is not possible to "wrap around" a segment without generating a limit fault. Further note that even though the segment expands down, the first byte of a multi-byte memory access is at a lower address than the last byte, as is true for expand up segments. Of course for single byte memory accesses, the first byte and the last byte are the same.

For expand down segments, two comparisons are necessary and sufficient to evaluate expand down limit faults. The first comparison checks the address of the first operand byte against the segment limit, which defines the lower valid extent of the expand down segment. Specifically, a limit fault must be signaled, if the following equation is satisfied:

Effective address≦Segment Limit.

Manipulating, the equation may be expressed as:

Effective address−Segment Limit≦0.

Using one's complement arithmetic, the equation becomes:

Effective address+!Segment Limit≦0.

According to the one's complement arithmetic rules mentioned supra, this inequality is true, and thus a limit fault is indicated, when no carry results. The lack of a carry thus indicates that the first operand byte was below (less than) or equal to the lower bound of the valid address region. Conversely, whenever the value of the effective address exceeds the segment limit, a carry out of the highest bit position occurs. Such a carry out means that the address was above the lower bound of the valid address region. If this "first-byte" comparison is implemented in 32-bit hardware, both 32-bit and 16-bit segments may be evaluated using an identical hardware configuration.

The second necessary comparison checks to see if an operand wraps around the Top of Segment. This can be viewed as comparing the address of the last byte of the operand against the upper bound of the valid address region for expand down segments. A limit fault must be signaled, if the following equation is satisfied:

Effective address+[Operand Size−1]>Top of Segment.

Manipulating and substituting the 32-bit value for the Top of Segment:

Effective address+[Operand Size−1]−Top of Segment>0.

Effective address+[Operand Size−1]−FFFFFFFF$_{16}$>0.

Manipulating, using one's complement arithmetic, and then reducing:

Effective address+[Operand Size−1]+00000000$_{16}$>0.

According to the one's complement arithmetic rules supra, this inequality is true, and thus a limit fault is indicated, whenever a carry out of the most significant bit results. The carry thus indicates that (at least) the address of the last byte of the operand wrapped around the Top of Segment.

The foregoing "Top of Segment Wrap Comparison" is valid for 32-bit segments. For 16-bit segments, the same 32-bit comparator may be employed, and the same carry out bit observed, provided that the value 0000FFFF$_{16}$ is used for the Top of Segment. Following the earlier equation development:

Effective address+[Operand Size−1]−Top of Segment >0.

Effective address+[Operand Size−1]−0000FFFF$_{16}$>0.

Manipulating, using one's complement arithmetic, and then reducing:

Effective address+[Operand Size−1]+FFFF0000$_{16}$>0.

As for the 32-bit case, a limit fault is indicated, whenever a carry out of the most significant bit results.

Because, the [Operand Size−1] requires only 3-bits (for 8-byte operands) and the Top of Segment has zeros in the lower 3-bits for both 16-bit and 32-bit segments, these two components may be combined to permit the use of a two-input comparator. The same hardware may thus be used, provided that the 16 MSB of the second input are zero for 32-bit segments and are set for 16-bit segments. The intermediate bits (bits <15:3> for 8-byte operands) are zero for both cases.

Expand down segments are only intended for use with stack segments. The present invention does not support the pathological use of expand down segments for code, as there are no provisions for checking whether the last byte of an instruction wrapped around the Top of Segment.

LIMIT CHECK STRUCTURE

Figure 1:
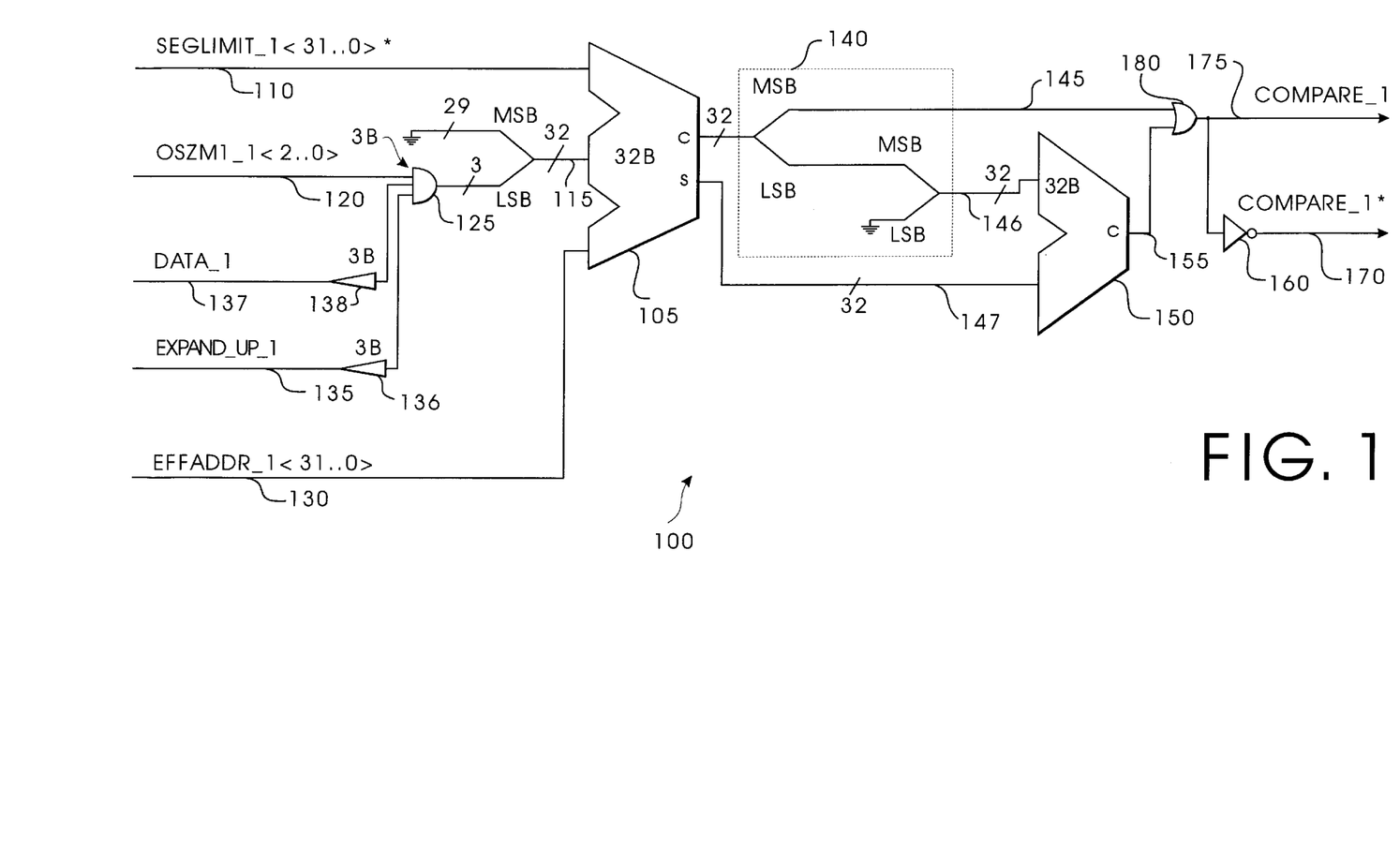
FIG. 1 illustrates a comparator 100 used to check if the first byte (for expand down) or last byte (for expand up) of a memory access is greater than the segment limit.

In FIG. 1, Comparator 100 is a three input comparator, built from 3-input Carry Save Adder (CSA) 105 and carry-propagate circuit 150, together with ancillary logic, to generate the carry signal COMPARE_1 175 and its compliment COMPARE_1* 170. Using a CSA followed by a carry-propagate circuit, is just one hardware implementation for adding three N-bit variables (having bits <N..0>). When using this CSA technique, the overall carry out of the most significant bit of the theoretical three variable addition, is the logical OR of the carry out of the most significant bit 145 of the CSA 105 with the carry out of the most significant bit 155 of the carry-propagate circuit 150. OR gate 180 performs the logical OR. Inverter 160 provides COMPARE_1* 170. Wiring network 140, acts to shift left by one bit the carry output vector from CSA 105. The shifted carry vector 146 and the sum output vector 147 are inputs to the carry-propagate circuit 150. Carry-propagate circuit 150 need only generate the carry out of the most significant bit (C<31>) 155. It is unnecessary to generate any sum output bits. In a preferred embodiment, carry-look-ahead techniques are used to in carry-propagate circuit 150.

The top input to CSA 105 is SEGLIMIT_1<31..0>* 110, discussed infra. OSZM1_1<2..0> 120, discussed in detail infra, is qualified by EXPAND_UP_1 135 and DATA_1 137 using 3-bit AND gate 125. Fanout symbols 136 and 138 indicate that the single bit signals EXPAND_UP_1 135 and DATA_1 137 are fanned out to drive 3-bit AND gate 125. The outputs of AND gate 125 become the 3 LSB of the middle input 115 of CSA 105. The 29 MSB of the middle input 115 are zero. EFFADDR_1<31..0> 130, represents the Effective Address, and is the bottom input to CSA 105.

Note that when EXPAND_UP_1 135 and DATA_1 137 are active, the middle input 115 to CSA 105 reflects the value of OSZM1_1<2..0> 120. Thus, for expand up data segments, comparator 100 of FIG. 1 compares the address of the last operand byte against the segment limit.

In contrast, when either EXPAND_UP_1 135 or DATA_1 137 are deasserted, the middle input 115 to CSA 105 is zero. Thus, for either expand down segments or for instructions, comparator 100 compares the address of the first byte of the memory access against the segment limit.

Figure 2:
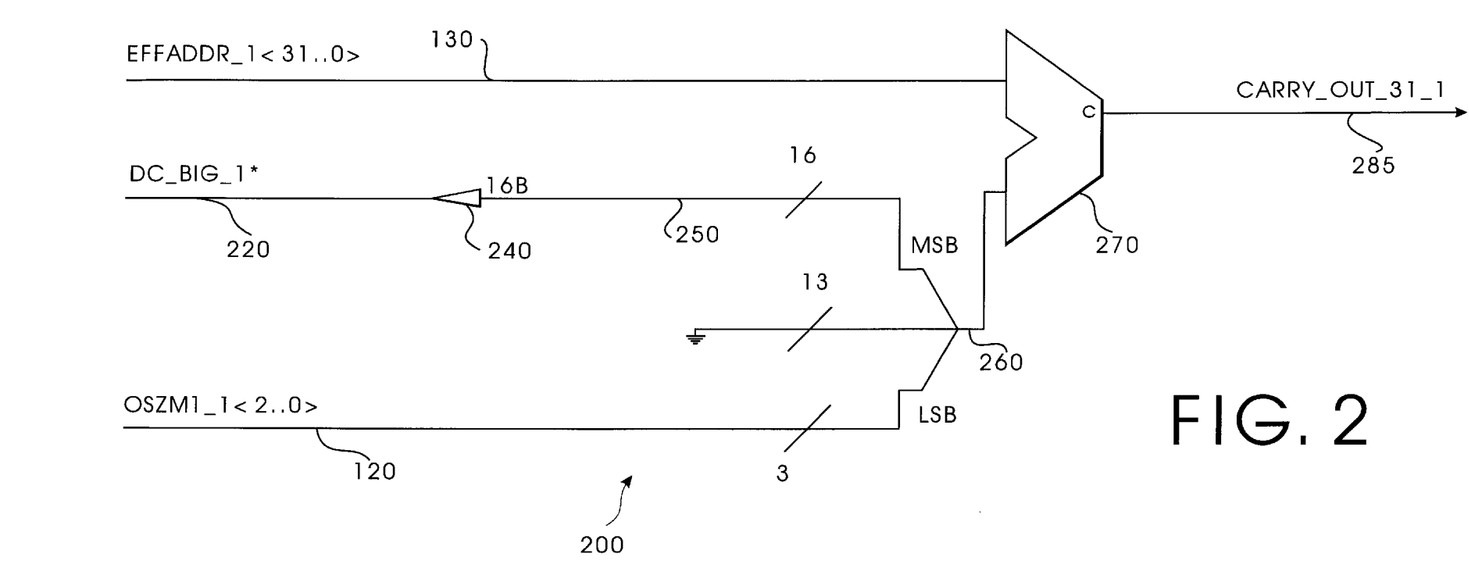
FIG. 2 illustrates logic 200 used to check if the last byte of a memory access illegally wraps the maximum address value of an expand down segment.

Logic 200 in FIG. 2 calculates the "Top of Segment wrap" for expand down segments. Comparator 270 is a two-input carry-propagation circuit, otherwise identical to carry-propagation circuit 150. The carry out of the most significant bit of comparator 270 is CARRY_OUT_31_1 285. The top input to comparator 270 is EFFADDR_1<31..0> 130. The bottom input to comparator 270 is signal 260. The 3 LSB of signal 260 is OSZM1_1<2..0> 120. The 16 MSB of signal 260 is signal 250, the 16-bit fanned out replication (note fanout symbol 240) of DC_BIG_1* 220. The intermediate 13 bits (bits <15..3>) of signal 260 are zero in the illustrated embodiment.

Note that when DC_BIG_1* 220 is low, logic 200 of FIG. 2 is checking the address of the last byte of the memory access for a wrap around the 32-bit Top of Segment, FFFFFFFF$_{16}$. In contrast, when DC_BIG_1* 220 is high, logic 200 is checking the address of the last byte of the memory access for a wrap around the 16-bit Top of Segment, 0000FFFF$_{16}$.

Figure 3:
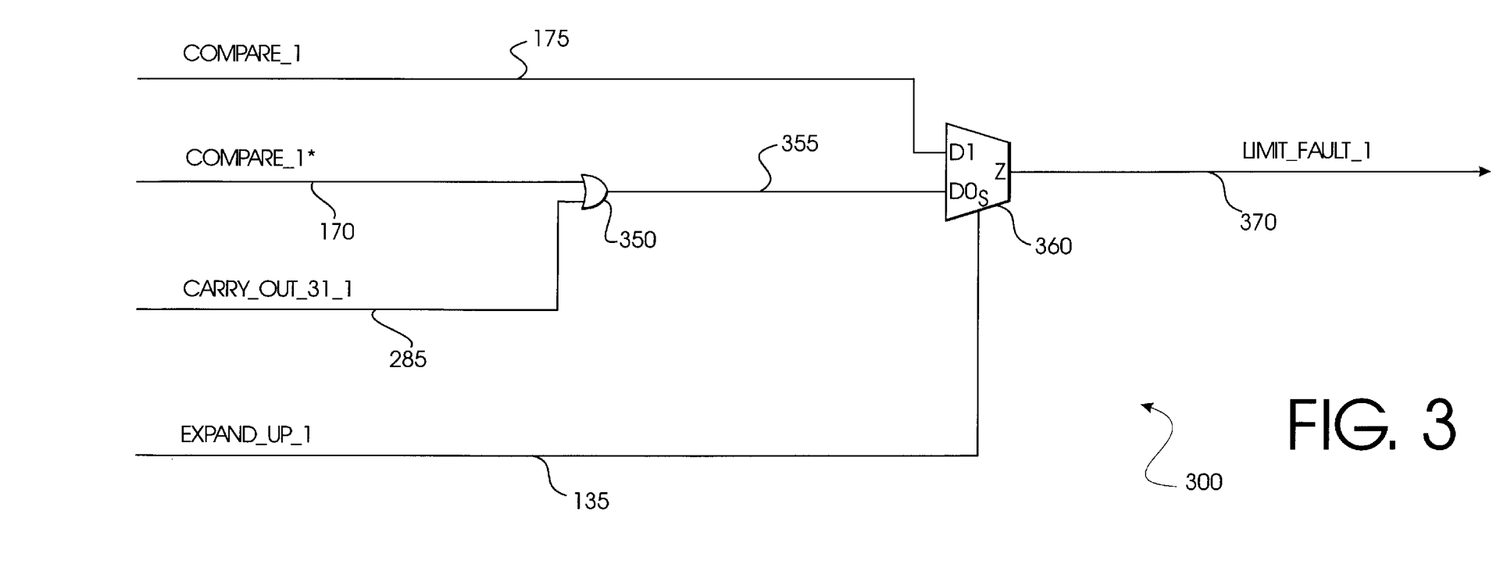
FIG. 3 shows logic used to evaluate limit faults using the signals from comparator 100 and logic 200, according to whether the segment of interest is of the expand up or expand down type.

Logic 300 in FIG. 3 generates LIMIT_FAULT_1 370, regardless of whether the segment of interest is expand up, expand down, 32-bit, or 16-bit. Multiplexor 360 outputs LIMIT_FAULT_1 370 according to the select input driven by EXPAND_UP_1 135. The upper input to Multiplexor 360 is COMPARE_175, the logic true output from comparator 100. The lower input 355 of multiplexor 360 is the output of OR gate 350. COMPARE_1* 170 and CARRY_OUT_31_1 285 are inputs to OR gate 350.

When the segment of interest is an expand up segment, EXPAND_UP_1 135 will be active, and LIMIT_FAULT_1 370 will follow COMPARE_1 175. The output of logic 200 is not used for expand up segments. Thus, limit faults for expand up segments are evaluated solely by comparator 100. In contrast, when the segment of interest is an expand down segment, EXPAND_UP_1 135 will be deasserted, and LIMIT_FAULT_1 370 will follow signal 355. Hence, limit faults for expand down segments are evaluated using the results of both comparator 100 and logic 200.

Figure 4:
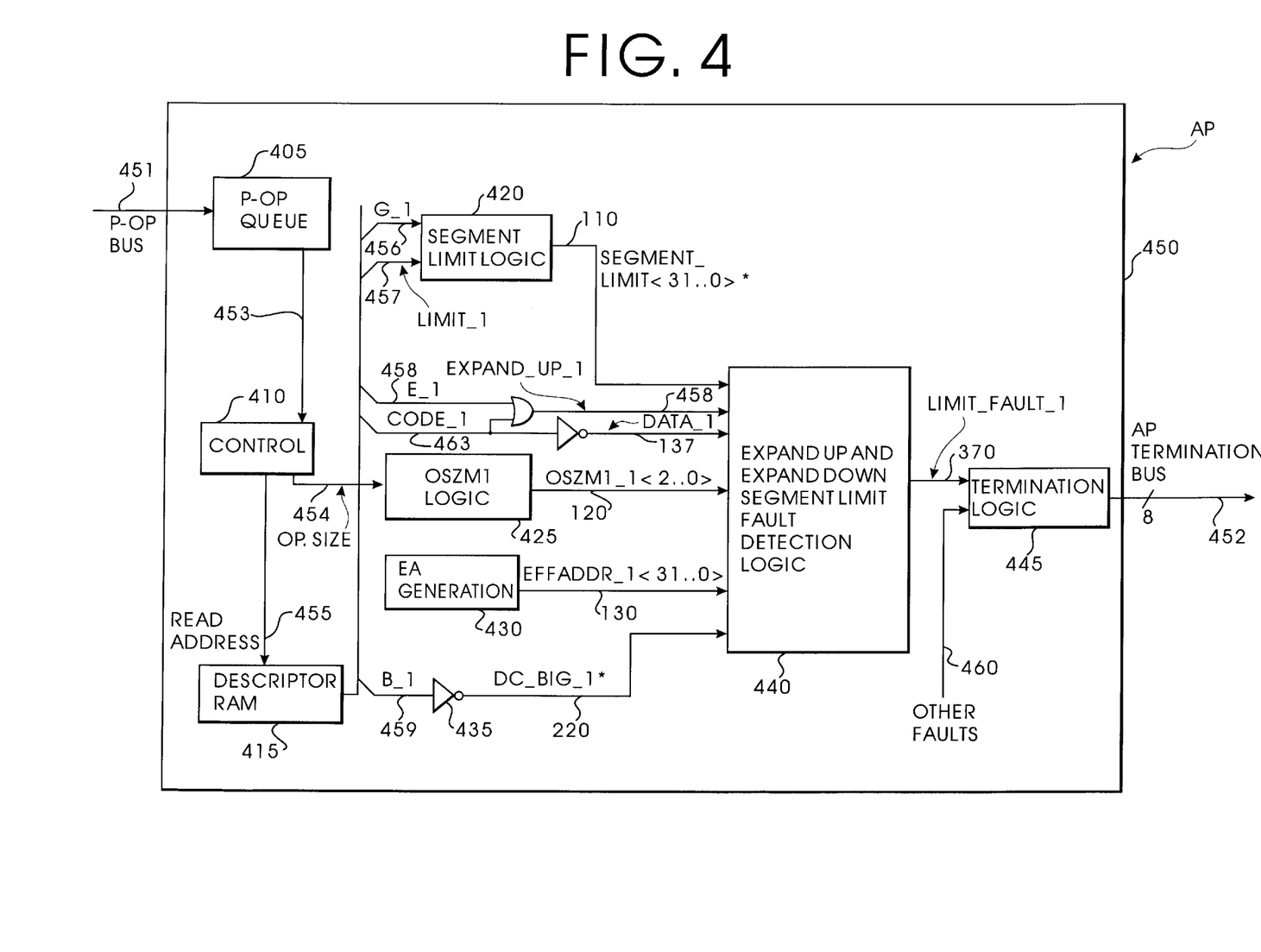
FIG. 4 shows the system context in which the logic of the present invention finds particular application. The logic of FIGS. 1, 2, and 3 are contained within block 440.

FIG. 4 shows the conceptual relationship of the previously discussed segment limit checking logic with the rest of the AP 450. Comparator 100, logic 200, and logic 300, of FIGS. 1, 2, and 3, respectively, are included within block 440 of FIG. 4. P-op Bus 451 delivers p-ops to P-OP QUEUE 405.

SEGLIMIT_1<31..0>* 110 is a 32-bit quantity, representing the segment limit for the segment of interest. SEGMENT LIMIT LOGIC 420 interprets the 20-bit segment limit field (LIMIT 457), in the descriptor of the segment of interest, according to the G-bit 456, and passes the interpreted SEGLIMIT_1<31..0>* 110 to block 440 (and ultimately comparator 100). Specifically, for G=0, the upper 12-bits of SEGLIMIT_1<31..0>* are one, and the lower 20-bits are given by the complement of the descriptor's segment limit field. For G=1, the upper 20-bits are given by the complement of the descriptor's segment limit field, and the lower 12-bits are one.

For data segments, EXPAND_UP_1 135 is derived by OR gate 462 from the Expansion-direction bit (E-bit) 458 in the descriptor of the segment of interest and is passed to block 440 (and ultimately to comparator 100 and logic 300). Code segments do not have an E-bit, but are always expand up. EXPAND_UP_1 135 is forced to one for code segments by OR gate 462 whenever CODE_1 463, the penultimate type bit of the descriptor of interest, is set.

DATA_1 137 is the complement of CODE_1 463. The complement is performed by inverter 461. DATA_1 137 is set for data segments and is clear for code segments. DATA_1 137 is passed to block 440 (and ultimately to comparator 100).

OSZM1_1<2..0> 120, represents the [Operand Size−1], and is the output of OSZM1 LOGIC 425, which is combinational logic driven by the memory access size. (For a one byte operand, OSZM1_1<2..0> is $000_2$. For an eight byte operand, OSZM1_1<2..0> is $111_2$.) In the illustrative embodiment, the operand size (OP. SIZE 454) is provided in the p-ops broadcast to the AP unit by the Decoder Unit.

EFFADDR_1<31..0> 130 is produced by EA GENERATION 430 and provided to block 440 (and ultimately to comparator 100 and logic 200).

DC_BIG_1* 200 is the complement of the Big bit (B-bit) 459 in the descriptor of the segment of interest. Inverter 435 performs the complement. DC_BIG_1* 220 is passed to block 440 (and ultimately to logic 200).

TERMINATION LOGIC 445 accepts LIMIT_FAULT_1 370, generated by logic 300 within block 440, as well as OTHER FAULTS 460, and drives the AP TERMINATION BUS 452, which is 8-bits in the illustrative embodiment.

CONTROL 410 generates signals for pipelined control of the functional units within AP 450 in order to execute p-ops taken from P-OP QUEUE 405. The segment limit check logic of block 440 is essentially one stage in the overall pipeline. The generation of the Effective Address and the reading of the descriptor fields, for use by block 440, takes place in the previous pipeline cycle.

CONCLUSION

Although the present invention has been described using a particular illustrative embodiment, it will be understood that many variations in construction, arrangement and use are possible within the scope of the invention. For example, the size of the maximum operand-width could be varied. The function of multiplexor 360 could be implemented using alternate methods, such as AND-OR gating, or 3-state bus techniques. CSA 105 could use 2-input half-adder cells for those bits (bits <31..3> in the illustrative embodiment) that have an input that is always zero. Also, comparator 100 could be implemented differently while still carrying out the comparisons with the segment limit according to the present invention. Specifically, a custom 3-input comparator, performing carry propagation in a single stage, could be used instead of using the technique disclosed, in which a first CSA stage is followed by a second carry propagation stage. Finally, the signal polarities used were chosen for clarity of expression. Different logic polarities may be observed in practice in order to minimize logic gates. The present invention is thus to be considered as including all possible modifications and variations encompassed within the scope of the appended claims.

We claim:

1. A comparator for checking a last byte of an operand against an expand up segment limit, the comparator comprising:

a first input driven by the complement of the expand up segment limit;

a second input driven by one less than the size of the operand; and a third input driven by the effective address of the first byte of the operand;

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively, when the comparator is used to check the last byte of the operand against the expand up segment limit;

a circuit for shifting one bit to the left the carry bit vector produced by the carry save adder to produce a shifted carry bit vector having the number of bit positions including a least significant bit position holding a logical zero; and a carry propagate circuit having a first input driven by the shifted carry bit vector and a second input driven by the sum bit vector produced by the carry save adder and producing a carry bit for the most significant bit position, wherein the last byte of the operand lies beyond the expand up segment limit if and only if at least one of the carry bit produced by the carry save adder for the most significant bit position, and the carry bit produced by the carry propagate circuit is a logical one.

2. A comparator for checking a first byte of an operand against an expand down segment limit, the comparator comprising:

a first input of the comparator driven by the complement of the expand down segment limit;

a second input of the comparator driven by a vector of logical zeroes;

a third input of the comparator driven by the effective address of the first byte of the operand;

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively, when the comparator is used to check the first byte of the operand against the expand down segment limit;

a circuit for shifting one bit to the left the carry bit vector produced by the carry save adder to produce a shifted carry bit vector having the number of bit positions including a least significant bit position holding a logical zero; and a carry propagate circuit having a first input driven by the shifted carry bit vector and a second input driven by the sum bit vector produced by the carry save adder and producing a carry bit for the most significant bit position, wherein the first byte of the operand lies below the expand down segment limit if neither the carry bit produced by the carry save adder for the most significant bit position nor the carry bit produced by the carry propagate circuit is a logical one.

3. A method for checking a last byte of an operand against an expand up segment limit, the method comprising:

providing a first quantity equal to the complement of the expand up segment limit to a first input of a comparator;

providing a second quantity equal to one less than the size of the operand to a second input of the comparator;

providing a third quantity equal to the effective address of the first byte of the operand to a third input of the comparator; and using the comparator to determine if a carry results from a summation of the first, second, and third quantities, the last byte of the operand lying above the segment limit if a carry results from the summation; wherein the comparator comprises:

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively;

a circuit for shifting one bit to the left the carry bit vector produced by the carry save adder to produce a shifted carry bit vector having the number of bit positions including a least significant bit position holding a logical zero; and a carry propagate circuit having a first input driven by the shifted carry bit vector and a second input driven by the sum bit vector produced by the carry save adder and producing a carry bit for the most significant bit position, wherein the last byte of the operand lies beyond the expand up segment limit if and only if at least one of the carry bit produced by the carry save adder for the most significant bit position, and the carry bit produced by the carry propagate circuit is a logical one.

4. A method for checking a first byte of an operand against an expand down segment limit, the method comprising:

providing a first quantity equal to the complement of the expand down segment limit to a first input of a comparator;

providing a second quantity equal to the effective address of the first byte of an operand to a second input of the comparator; and using the comparator to determine if a carry results from a summation of the first and second quantities, the first byte of the operand lying below the segment limit if a carry does not result from the summation, wherein the comparator comprises:

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first and second inputs of the carry save adder being driven by the first and second inputs of the comparator, respectively;

a circuit for shifting one bit to the left the carry bit vector produced by the carry save adder to produce a shifted carry bit vector having the number of bit positions including a least significant bit position holding a logical zero; and a carry propagate circuit having a first input driven by the shifted carry bit vector and a second input driven by the sum bit vector produced by the carry save adder and producing a carry bit for the most significant bit position, wherein the first byte of the operand lies below the expand down segment limit if neither the carry bit produced by the carry save adder for the most significant bit position nor the carry bit produced by the carry propagate circuit is a logical one.

5. A system for checking a last byte of an operand against an expand up segment limit, the system comprising:

a comparator having first, second, and third inputs for determining if a carry results from a summation of quantities presented at the first, second, and third inputs, wherein the comparator comprises:

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively, when the comparator is used to check the last byte of the operand against the expand up segment limit;

a circuit for shifting one bit to the left the carry bit vector produced by the carry save adder to produce a shifted carry bit vector having the number of bit positions including a least significant bit position holding a logical zero; and a carry propagate circuit having a first input driven by the shifted carry bit vector and a second input driven by the sum bit vector produced by the carry save adder and producing a carry bit for the most significant bit position, wherein the last byte of the operand lies beyond the expand up segment limit if and only if at least one of the carry bit produced by the carry save adder for the most significant bit position, and the carry bit produced by the carry propagate circuit is a logical one;

logic for providing a first quantity equal to the complement of the expand up segment limit to the first input of the comparator;

logic for providing a second quantity equal to one less than the size of the operand to the second input of the comparator; and logic for providing a third quantity equal to the effective address of the first byte of the operand to the third input of the comparator;

whereby the last byte of the operand is found to lie above the segment limit if a carry results from the summation.

6. A system for checking a first byte of an operand against an expand down segment limit; the system comprising:

a comparator having first, second, and third inputs for determining if a carry results from a summation of quantities presented at the first, second, and third inputs, wherein the comparator comprises:

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, wherein:

the first input of the carry save adder is driven by the complement of the expand down segment limit, when the comparator is used to check the first byte of the operand against the expand down segment limit;

the second input of the carry save adder is driven by a vector of logical zeroes, when the comparator is used to check the first byte of the operand against the expand down segment limit;

the third input of the carry save adder is driven by the effective address of the first byte of the operand, when the comparator is used to check the first byte of the operand against the expand down segment limit;

a circuit for shifting one bit to the left the carry bit vector produced by the carry save adder to produce a shifted carry bit vector having the number of bit positions including a least significant bit position holding a logical zero; and     a carry propagate circuit having a first input driven by the shifted carry bit vector and a second input driven by the sum bit vector produced by the carry save adder and producing a carry bit for the most significant bit position, wherein the first byte of the operand lies below the expand down segment limit if neither the carry bit produced by the carry save adder for the most significant bit position nor the carry bit produced by the carry propagate circuit is a logical one.

7. Expand down segment limit checking logic, comprising:

a first comparator for checking a first byte of an operand against an expand down segment limit, the first comparator having first and second inputs and an output for indicating a limit fault, the first comparator including:

a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively, when the comparator is used to check the first byte of the operand against the expand down segment limit;

a circuit for shifting one bit to the left the carry bit vector produced by the carry save adder to produce a shifted carry bit vector having the number of bit positions including a least significant bit position holding a logical zero; and         a carry propagate circuit having a first input driven by the shifted carry bit vector and a second input driven by the sum bit vector produced by the carry save adder and producing a carry bit for the most significant bit position, wherein the output of the first comparator indicates a fault if neither the carry bit produced by the carry save adder for the most significant bit position nor the carry bit produced by the carry propagate circuit is a logical one;

logic for providing the complement of the expand down segment limit to the first input of the first comparator;

logic for providing the effective address of the first byte of an operand to the second input of the first comparator;

a second comparator for checking a last byte of the operand against the top of the expand down segment, the second comparator having first and second inputs and an output for indicating a limit fault, the output being equal to the carry out of the most significant bit of the first comparator;

logic for providing the effective address of the first byte of the operand to the first input of the second comparator; and     logic for providing a quantity having an upper portion and a lower portion to the second input of the second comparator, wherein         the upper portion has a plurality of bits set equal to the complement of the big-bit of the expand down segment, and         the lower portion is coupled to a pre-processed variable equal to the operand size minus one.

8. A comparator for checking a byte of an operand against a segment limit comprising:

a first input driven by the complement of the expand up segment limit;

a second input driven by one less than the size of the operand;

a third input driven by the effective address of the first byte of the operand;

a fourth input driven by a vector of logical zeros; and a 3-input carry save adder for adding quantities driving first, second, and third inputs of the carry save adder, respectively, each of the inputs having an equal number of bit positions including a most significant bit position, the carry save adder producing a carry bit vector and a sum bit vector consisting of a carry bit and a sum bit, respectively, for each of the number of bit positions, the first, second, and third inputs of the carry save adder being driven by the first, second, and third inputs of the comparator, respectively, when the comparator is used to check the last byte of the operand against the expand up segment limit and the first, second, and third inputs of the carry save adder being driven by the first, third, and fourth inputs of the comparator, respectively, when the comparator is used to check the first byte of the operand against an expand down segment limit;

a circuit for shifting one bit to the left the carry bit vector produced by the carry save adder to produce a shifted carry bit vector having the number of bit positions including a least significant bit position holding a logical zero; and     a carry propagate circuit having a first input driven by the shifted carry bit vector and a second input driven by the sum bit vector produced by the carry save adder and producing a carry bit for the most significant bit position, wherein the byte of the operand lies beyond the segment limit if and only if at least one of the carry bit produced by the carry save adder for the most significant bit position, and the carry bit produced by the carry propagate circuit is a logical one.

9. A method of comparing an operand against a segment limit comprising the steps of:

provide a first input driven by the complement of the expand up segment limit;

providing a second input driven by one less than the size of the operand;

providing a third input driven by the effective address of the first byte of the operand;

providing a fourth input driven by a vector of logical zeros; wherein each of the first second, third and fourth inputs having an equal number of bit positions including a most significant bit position;

if the segment limit is an expand up segment limit:

summing the first, second, and third inputs with a 3-input carry save adder, the carry save adder producing a carry bit vector and a sum bit vector consisting of a carry bit and a sum bit, respectively, for each of the number of bit positions;

shifting the carry bit vector produced by the carry save adder one bit to the left to produce a shifted carry bit vector having the number of bit positions including a least significant bit position holding a logical zero;

summing the shifted carry bit vector and the sum bit vector with a carry propagate circuit to produce a carry bit for the most significant bit position; and determining the operand lies beyond the segment limit if at least one of the carry bit produced by the carry save adder for the most carry significant position and the carry bit produced in the carry propagate circuit is a logical one; and if the segment is an expand down segment limit:

summing the first, third, and fourth inputs with a 3-input carry save adder, the carry save adder producing a carry bit vector and a sum bit vector consisting of a carry bit and a sum bit, respectively, for each of the number of bit positions;

shifting the carry bit vector produced by the carry save adder one bit to the left to produce a shifted carry bit vector having the number of bit positions including a least significant bit position holding a logical zero;

summing the shifted carry bit vector and the sum bit vector with a carry propagate circuit to produce a carry bit for the most significant bit position; and determining the operand lies beyond the segment limit if both the carry bit produced by the carry save adder for the most carry significant position and the carry bit produced in the carry propagate circuit is a logical zero.

* * * * *